Feb. 8, 1927.

H. S. WILLIAMS 1,616,775

SAFETY PRESSURE VALVE DEVICE

Filed May 3, 1924

Inventor
H. S. Williams

By

Attorney

Patented Feb. 8, 1927.

UNITED STATES PATENT OFFICE.

HARVEY S. WILLIAMS, OF ZEPHYR, TEXAS.

SAFETY PRESSURE-VALVE DEVICE.

Application filed May 3, 1924. Serial No. 710,887.

This invention relates to new and useful improvements in safety pressure valve devices.

The object of the invention is to provide a valve device arranged to permit a flow of fluid under a normal pressure, but automatically cutting off the flow under an excessive pressure or increased velocity.

Another object is to provide a safety device having a relatively stationary valve and a resiliently sustained piston carrying a seat for the valve, normally spaced therefrom, together with means for adjusting the valve with relation to its seat.

A further object is to provide a stationary deflector at the entrance of the device to receive the initial impact of the inflowing fluid and spread the same, whereby the piston is shouldered and caused to remain in its normal position.

A construction designed to carry out the invention will be hereinafter described together with other features of the invention.

Figure 1:
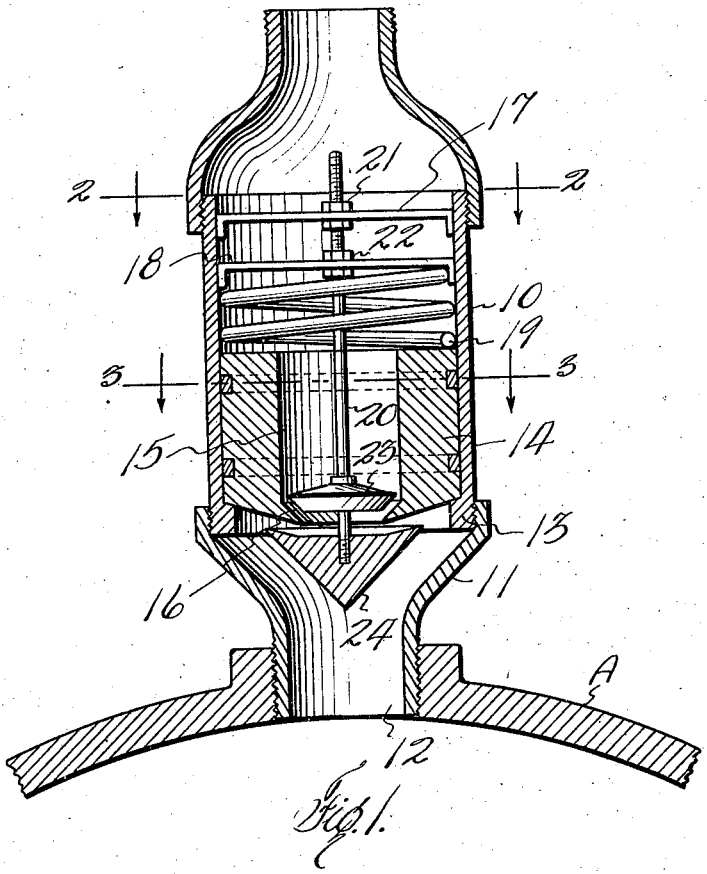
Figure 2:
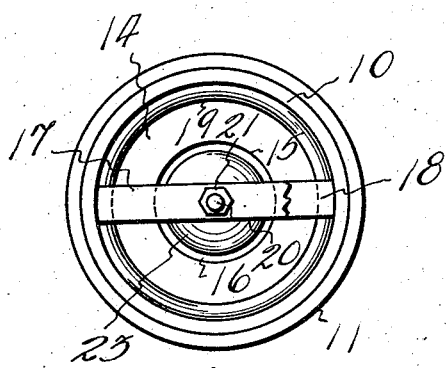
Figure 3:
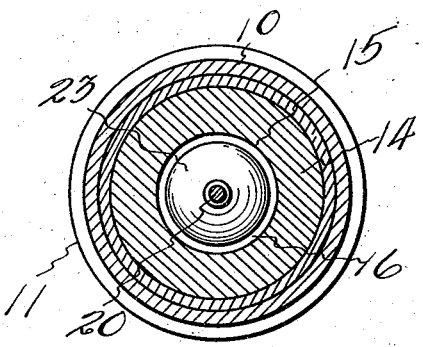

The invention will be more readily understood from a reading of the following specification and by reference to the accompanying drawings, in which an example of the invention is shown, and wherein:

Fig. 1 is a vertical sectional view of a safety valve device constructed in accordance with my invention, Fig. 2 is a plan view of the same, and Fig. 3 is a horizontal cross-sectional view taken on the line 3—3 of Fig. 1.

In the drawings the numeral 10 designates a cylinder having its lower end screwed into a cup 11. The cup has a stem 12 which may be screwed into a boiler, tank, fountain head or other receptacle A from which it is desired to control the flow of fluid. The upper portion of the cup is flared at an angle to the perpendicular.

An internal annular stop flange 13 is provided at the lower end of the cylinder and normally supports a tubular piston 14 mounted to slide vertically in the cylinder. The piston has an axial bore or passage 15 at the lower end of which is formed a valve seat 16. At the upper end of the cylinder is mounted a cross bar 17 and below this bar is mounted a second cross bar 18, spaced therefrom. A coiled spring 19 having its upper end confined by the cross bar 18 rests upon the piston 14 and holds the latter on the flange 13. The piston is thus held under spring tension.

A valve stem 20 is immovably held in the bars 17 and 18 by means of nuts 21 and 22, whereby it is vertically adjustable. A valve 23 is fastened on the stem within the bore 15, just above the seat 16. The valve is stationary and is engaged by the seat when the piston is displaced upwardly. By vertically adjusting the stem 20, the distance the piston must travel before seating the valve, is controlled. The tension of the spring 19 governs the pressure which must be exerted to lift the piston.

An inverted conical deflector 24 is mounted on the lower end of the stem 20 within the cup 11, immediately below the piston 14. The sides of this deflector conform generally to the sides of the cup and the upper end of the deflector has a diameter greater than that of the seat 16. The top of the deflector is dished and the bottom of the piston is bevelled to conform thereto.

In operation the fluid under pressure such as steam, enters the stem 12 and encounters the deflector 24 which takes the initial impact and spreads the fluid. The fluid passes up the sides of the deflector and then impinges the bottom of the piston. The tension of the spring 19 is sufficient to resist the pressure of the fluid and it finds its way between the piston and the dished top of the deflector to the bore 15, after passing through the seat 16. From the bore 15 the fluid passes into the cylinder from which it is suitably conducted as desired.

Should an excess of fluid under an abnormal pressure or flowing with an increased velocity, enter the cup, it will impinge the piston and overcome the tension of the spring 19, thus forcing the piston upwardly. When the piston is moved upwardly the seat 16 will be engaged with the valve 23, whereby the bore 15 will be closed. This will automatically cut off the flow of fluid. The device is especially useful with locomotive boilers to cut off an excessive flow of steam, but it may be used in numerous other places.

Various changes in the size and shape of the various parts, as well as modifications and alterations may be made within the scope of the appended claims.

What I claim, is:

1. In a safety pressure valve device, a cylinder having an interior stop at one end, a spring tensioned piston in the cylinder normally held in engagement with said stop and having a fluid passage and valve seat therein, a stationary valve positioned relative to the stop to maintain a fixed opening and to be engaged by the seat when the piston is displaced from the stop, and a stationary deflector in advance of the piston stop and overlapping the opening to the valve seat.

2. In a safety pressure valve device, a cup having a depending stem, a cylinder mounted in the cup, a piston movable in the cylinder and having a normally open axial bore and a valve seat, a valve stem stationary in the cylinder and passing through the bore and seat of the piston, a valve mounted on the stem adjacent the seat of the piston, a stop within the cylinder spaced to provide a fixed opening at the valve when engaged by the cylinder, an inverted conical deflector stationary on the stem below the piston, and a coiled spring confined in the cylinder and bearing on the piston to maintain it in contact with said stop.

3. In a safety pressure valve device, a cylinder, a stop within the same and at the lower end thereof, a piston slidable within said cylinder and normally engaging said seat, spring means maintaining said piston upon said stop, said piston having an axial bore extending entirely through the same, a valve seat within said bore, a stem fixed within said cylinder and extending through said bore, a valve head affixed to said stem and disposed relative to the piston stop to maintain a fixed opening at said bore seat, and a deflector secured to said stem at the lower end thereof and spaced at a fixed distance from the adjacent end of said piston when spring seated.

In testimony whereof I affix my signature.

HARVEY S. WILLIAMS.